Aug. 8, 1950     H. V. PACKER     2,518,172
BAR FEED MECHANISM
Filed Oct. 14, 1944         2 Sheets-Sheet 2
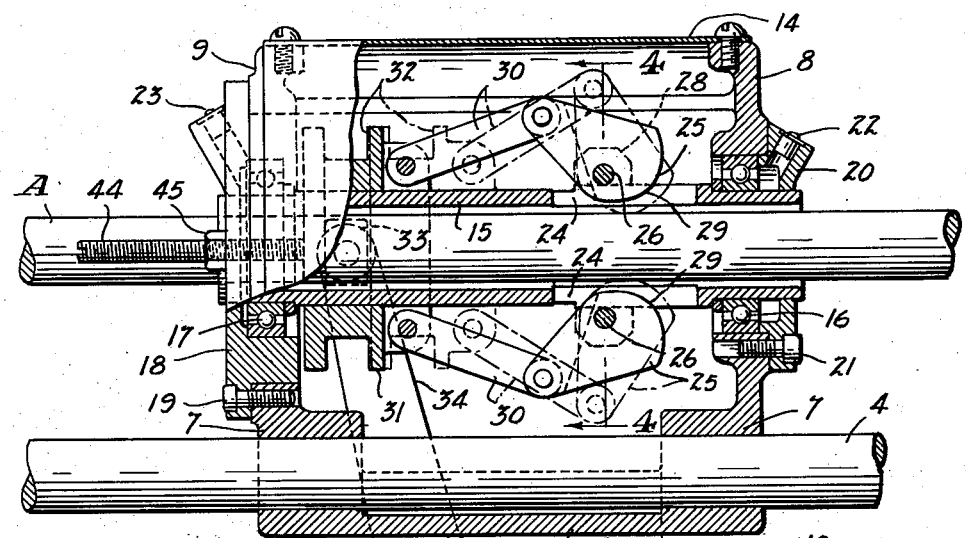
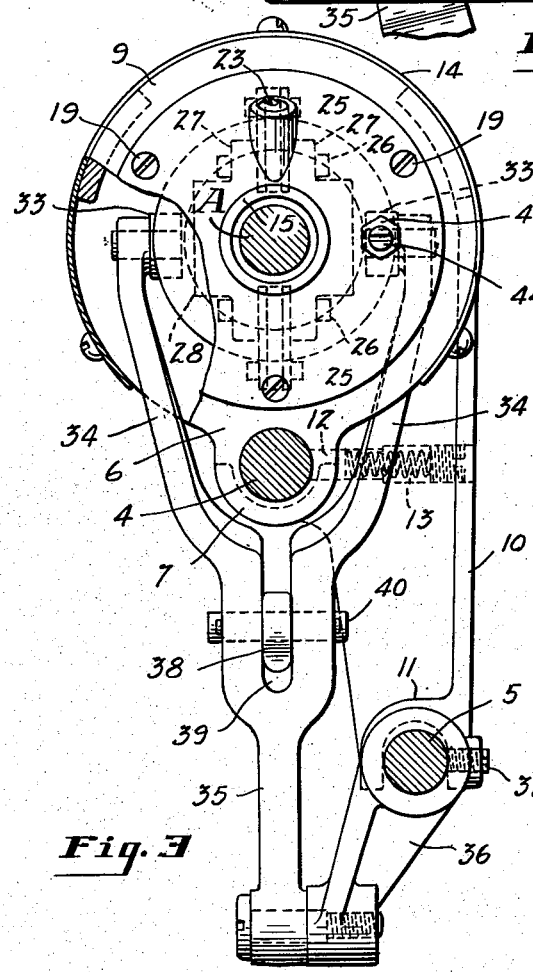
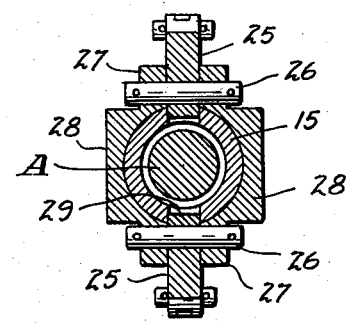
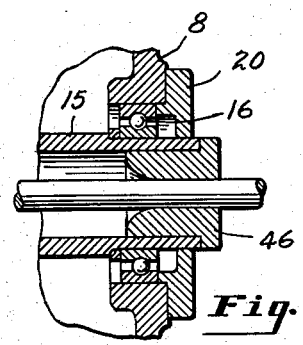
INVENTOR.
Harry V. Packer
BY
Evans & McCoy
ATTORNEYS Patented Aug. 8, 1950

2,518,172

UNITED STATES PATENT OFFICE 2,518,172

BAR FEED MECHANISM

Harry V. Packer, East Cleveland, Ohio, assignor to The Oster Manufacturing Company, Cleveland, Ohio, a corporation of Ohio Application October 14, 1944, Serial No. 558,758

3 Claims. (Cl. 29—61)

1

This invention relates to an improved device for imparting endwise feeding movements to bar stock to progressively advance stock for machining operations in a lathe or the like.

The invention has for its object to provide a feed mechanism by which the lathe operator may impart the desired amount of feed movement to the rotating bar stock at any time desired by means of an actuating lever.

It is also an object of this invention to provide a mechanism by which a bar of any length may be fed into the machine without resetting or adjusting any part of the feed mechanism or parts associated with the feed mechanism.

The feed mechanism of the present invention is of the type in which the actuator for advancing the bar stock is connected to the stock grippers to apply the grippers to the stock at the beginning of the forward stroke of the actuator, and has for its object to provide a simple means for quickly and easily adjusting the grippers to bar stock of different sizes so as to reduce the lost motion in the actuating mechanism due to the actuation of the gripping jaws.

With the above and other objects in view, the invention may be said to comprise the feed mechanism as illustrated in the accompanying drawings, hereinafter described and particularly set forth in appended claims, together with such variations and modifications thereof as will be apparent to one skilled in the art to which the invention pertains.

Reference should be had to the accompanying drawings forming a part of this specification, in which:

Fig. 2 is a central longitudinal vertical section through the bar stock feeding slide;

Fig. 3 is a section taken on the line indicated at 3—3 in Fig. 1;

Fig. 4 is a section taken on the line indicated at 4—4 in Fig. 2, and

Fig. 5 is a section through one end of the gripper carrying sleeve, showing the guide bushing which may be used with bar stock of small diameter.

Figure 1:
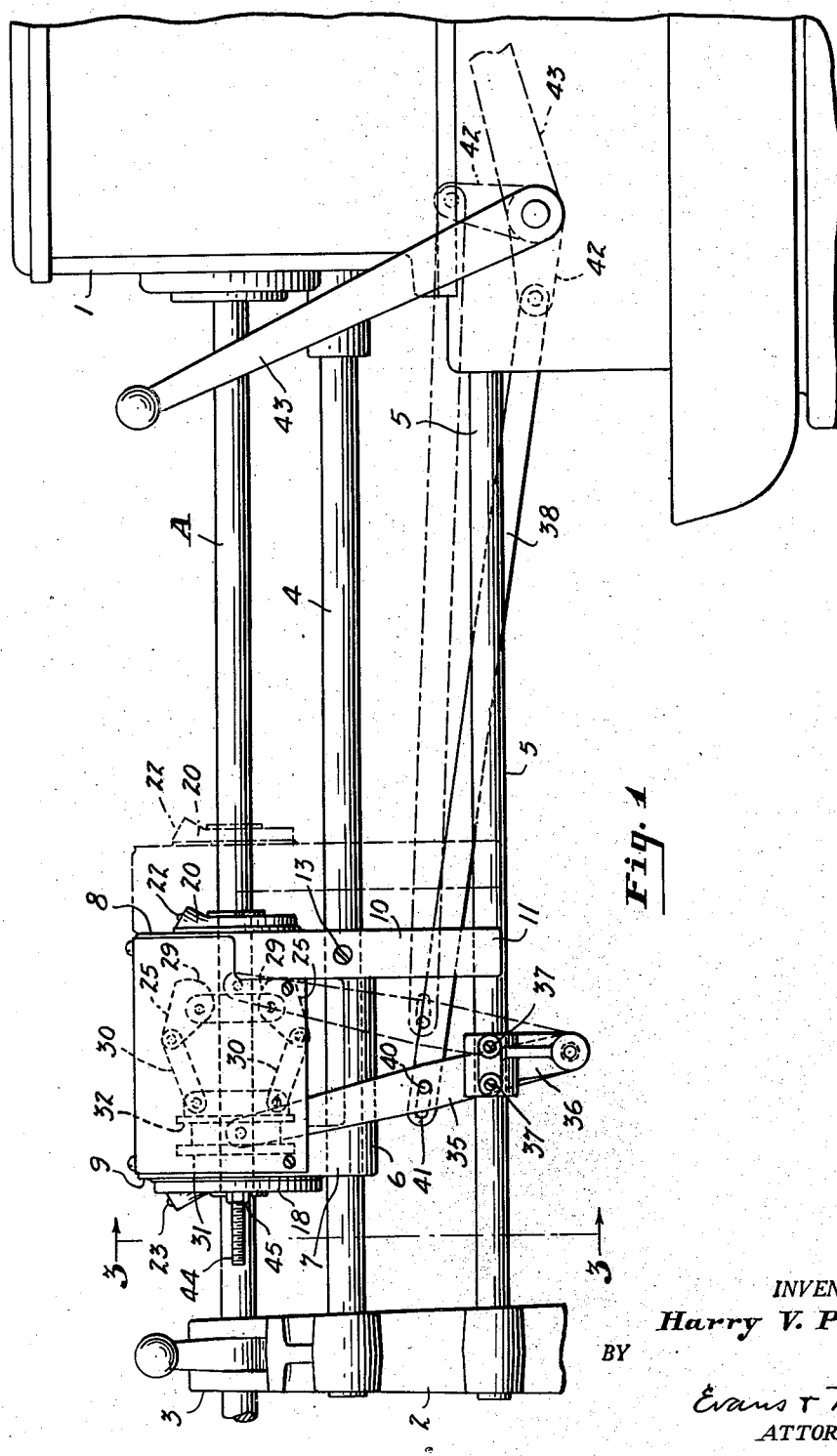
Fig. 1 is a side elevation of a feed mechanism embodying the invention.

In the accompanying drawings the invention is shown applied to the feeding of bar stock indicated by the reference character A, through the head 1 of a lathe, the stock being supported rearwardly of the head 1 by a standard 2 which has a stock guide portion 3 at its upper end. The standard 2 also provides a support for the rear ends of guide rods 4 and 5 which are

2 attached at their forward ends to the head 1. The guide rods 4 and 5 support a stock feeding slide 6 that has bearing portions 7 at the ends thereof that have a sliding fit on the upper guide rod 4. Front and rear end rings 8 and 9 are formed integrally with the end bearing portions 7 of the slide and the forward ring 8 has an integral downwardly extending arm 10 that has a bearing portion 11 that engages with the lower guide rod 5.

In order to yieldably hold the slide 6 in different positions of adjustment on the guide rods 4 and 5, the forward guide portion 7 carries a brake 12 that is pressed against the guide rod 4 by means of a spring 13 that is interposed between the brake 12 and the arm 10. The brake 12 exerts sufficient frictional resistance to movement of the slide on the guide rod 4 to hold the slide in adjusted position on the rod except when positively actuated.

The front and rear rings 8 and 9 support a cylindrical cover 14 formed of sheet metal and covering the top and sides of the head. A bar stock receiving sleeve 15 is rotatably mounted in the head centrally of the rings 8 and 9, the forward end of the sleeve being supported by ball bearing 16 mounted in the ring 8 and the rear end of the sleeve being supported by ball bearing 17 carried by a head 18 secured by means of attaching bolts 19 to the rear ring 9 of the slide. The forward ball bearing 16 is protected by a guard 20 attached to the ring 8 by means of screws 21, the guard 20 being provided with a lubricating fitting 22 through which lubricant may be forced into the bearing. The head 18 at the rear end of the slide forms a guard for the rear bearing 17 and is provided with a lubricating fitting 23 through which lubricant may be supplied to the bearing 17.

The sleeve 15 is an open ended sleeve through which the bar stock A may be passed and its ball bearing support permits the sleeve to rotate freely with the bar stock. The sleeve is provided adjacent the forward end of the head, with diametrically opposite longitudinal slots 24 which receive bar gripping jaws 25 that are carried by transverse pivots 26 that extend through slotted projections 27 of a hinge collar 28 that is fixed to the sleeve 15. The slots of the collar 28 register with the slots 24 of the sleeve to receive the jaws 25. The inner ends of the gripping jaws 25 have cam faces 29 for engagement with the bar stock, and the outer ends of the jaws are connected by links 30 to a collar 31 that is slidable on the sleeve 15. The collar 31 has an external groove 32 that receives rollers 33 on the upper end of yoke arms 34 that form the upper end of a lever 35. The lever 35 is pivoted at its lower end to a bracket 36 that is secured in adjusted position on the guide rod 5 by means of screws 37. The lever 35 is actuated by means of a connecting rod 38 that is received at its rear end in a slot 39 at the crotch of the arms 34 and is connected to the lever by means of a pin 40 extending across the slot 39 and through a longitudinal slot 41 in the rod 38. The forward end of the connecting rod 38 is pivotally connected by a short arm 42 with an actuating lever 43. When the lever 43 is moved forwardly, the lever 35 is also swung in a forward direction, causing the collar 31 to slide forwardly on the sleeve 15 to move the jaws 25 into gripping engagement with the bar stock A. An efficient grip on the bar stock is insured by the leverage on the jaws, and by reason of the fact that the forward movement of the slide 6 is impeded by the brake 12 so that before the slide 6 begins to move forwardly, the bar stock is firmly gripped and will move with the slide. The lathe operator by actuation of the lever 43, can at any time move the bar stock forwardly as much as desired.

In order to limit the lost motion between the lever 43 and the slide 6, means is provided for adjusting the jaws 25 to the particular bar stock being fed. The adjusting device is in the form of a stop screw 44, parallel with the sleeve 15 that is threaded in the rear head 18 and held in adjusted position by means of a lock nut 45. The stop screw 44 is in the path of movement of the collar 31 and limits the rearward movement of the collar in the head. By adjusting the screw 44 forwardly, the releasing movement of the jaws 25 may be limited so that the jaws 25 will move only enough to free themselves from the bar stock. Whatever the diameter of the stock, the gripping jaws 25 may be adjusted for a very small angular movement into and out of engagement with the bar by means of the screw 44.

When the bar stock being handled is of small diameter, the sleeve 15 may be provided with guide bushings 46, as shown in Fig. 5, to center the bar with respect to the sleeve. With the bar so centered, the screw 44 may be adjusted forwardly until the cam faces 29 are almost in engagement with the bar, so that the jaws will grip the bar immediately upon forward movement of the actuating lever.

It is to be understood that variations and modifications of the specific device herein shown and described for purposes of illustration, may be made without departing from the spirit of the invention.

What I claim is:

1. A bar stock feeding mechanism comprising a support, a slide mounted for linear movement on said support, a bar receiving sleeve rotatably mounted in the slide for movement therewith and extending in the direction of movement of the slide, bar gripping jaws connected to the sleeve at circumferentially spaced points by transverse pivots and having bar engaging cam faces inwardly of the pivots, a collar slidable axially on said sleeve, a link connected to each jaw outwardly of its pivot and to said collar, and a lever pivoted to the support and engaging said collar to apply axial thrusts in either direction thereto to actuate the jaws and shift the slide.

2. A bar stock feeding mechanism comprising a support, a slide mounted for linear movement on said support, a bar receiving sleeve rotatably mounted in the slide for movement therewith and extending in the direction of movement of the slide, bar gripping jaws connected to the sleeve by transverse pivots and having bar engaging cam faces inwardly of the pivots, a collar slidable axially on said sleeve, means for applying axial thrusts to said collar in either direction, a link connecting each jaw to said collar for applying a clamping thrust to each jaw and an axial thrust through the jaws and sleeve to said slide upon movement of the collar in one direction, an axially adjustable stop carried by said slide in the path of movement of said collar to limit its axial movement on the sleeve in the opposite direction.

3. A bar stock feeding mechanism comprising a support, a housing mounted for linear movement on said support, said housing having end walls with bearings therein alined in the direction of movement of the housing, a bar receiving sleeve within the housing journaled at its ends in said bearings, said sleeve having circumferentially spaced slots adjacent one end of the housing, a collar carried by the sleeve between the said slots and the opposite end of the housing and slidable axially on said sleeve, means for applying axial thrusts to said collar, clamping jaws pivoted to said sleeve and movable radially in said slots, actuating links pivoted to said jaws and said collar for applying a clamping thrust to said jaws and an axial thrust through the jaws to the housing upon movement of the collar toward said jaws, and an axially adjustable stop carried by the housing for limiting the axial movement of the collar away from the jaws.

HARRY V. PACKER.

REFERENCES CITED

The following references are of record in the file of this patent:

UNITED STATES PATENTS

| Number | Name | Date |
|---|---|---|
| 289,655 | Heyne | Dec. 4, 1883 |
| 911,911 | Sisson | Feb. 9, 1909 |
| 1,063,697 | Kendrick | June 13, 1913 |
| 1,212,605 | Brightman | Jan. 16, 1917 |
| 1,257,035 | Smith | Feb. 19, 1918 |
| 2,388,594 | Bogart | Nov. 6, 1945 |

FOREIGN PATENTS

| Number | Country | Date |
|---|---|---|
| 25,756 | Great Britain | A. D. 1904 |
| 510,312 | Great Britain | July 31, 1939 |